US007796181B2

(12) United States Patent
Iwane

(10) Patent No.: US 7,796,181 B2
(45) Date of Patent: Sep. 14, 2010

(54) COLOR TEMPERATURE CONVERSION ELEMENT, COLOR TEMPERATURE CONVERSION DEVICE AND ILLUMINATOR

(75) Inventor: Toru Iwane, Yokohama (JP)

(73) Assignee: Nikon Corporation, Tokyo (JP)

( * ) Notice: Subject to any disclaimer, the term of this patent is extended or adjusted under 35 U.S.C. 154(b) by 796 days.

(21) Appl. No.: 11/631,167

(22) PCT Filed: Feb. 24, 2006

(86) PCT No.: PCT/JP2006/303424

§ 371 (c)(1), (2), (4) Date: Dec. 29, 2006

(87) PCT Pub. No.: WO2006/090837

PCT Pub. Date: Aug. 31, 2006

(65) Prior Publication Data

US 2008/0291390 A1 Nov. 27, 2008

(30) Foreign Application Priority Data

Feb. 25, 2005 (JP) ............................ 2005-051345

(51) Int. Cl.
*H04N 5/225* (2006.01)
*G02B 13/16* (2006.01)

(52) U.S. Cl. ....................... 348/335; 348/340; 348/345; 348/348; 445/24; 445/25; 349/155; 349/156; 349/157

(58) Field of Classification Search ................ 348/335, 348/340, 345, 348; 445/24, 25; 349/155, 349/156, 157
See application file for complete search history.

(56) References Cited

U.S. PATENT DOCUMENTS

2006/0023278 A1* 2/2006 Nishioka ..................... 359/15

FOREIGN PATENT DOCUMENTS

JP A 2001-054121 2/2001
JP A 2002-122853 4/2002

* cited by examiner

*Primary Examiner*—Yogesh K Aggarwal
(74) *Attorney, Agent, or Firm*—Oliff & Berridge, PLC

(57) ABSTRACT

A color temperature conversion element includes a diffractive optical element that includes a polymer and a liquid crystal and diffracts light with a specific wavelength in incident light.

14 Claims, 12 Drawing Sheets

(a) VOLTAGE UNAPPLIED STATE (b) VOLTAGE APPLIED STATE

COLOR TEMPERATURE CONVERSION ELEMENT, COLOR TEMPERATURE CONVERSION DEVICE AND ILLUMINATOR

TECHNICAL FIELD

The present invention relates to an element and a device that convert the color temperature of incident light and an illuminator equipped with them.

BACKGROUND ART

An electronic flash device that radiates artificial light onto a subject being photographed may illuminate the subject by altering the color temperature of the illuminating light for optimal photographic expression. In addition, in an environment in which the color temperature of light illuminating the subject changes, e.g., an environment in which the illuminating light switches from sunlight to incandescent light, the color temperature may be corrected by inserting a color glass filter in an optical system of the camera so as to accurately reproduce the color tone. However, only limited color temperature correction is achieved and the color temperature cannot be corrected in a continuous manner either by combining the use of auxiliary light from a strobe or by using a color glass filter.

An imaging filter constituted with a liquid crystal is used in the known art in order to continuously correct the color temperature over a wide range (for instance, patent reference literature 1). Through such a color temperature correction filter, which is formed by filling a cell with a guest host liquid crystal material containing a dichroic pigment varying light absorption characteristics in correspondence to specific molecular arrangements, the color temperature of the incident light is altered by controlling the arrangement of the pigment molecules and thus altering the level of the absorption of light with a short wavelength as a voltage is applied to the liquid crystal.

Patent reference literature 1: Japanese Laid Open Patent Publication No. 2001-054121 (page 3 and FIGS. 1 and 3)

DISCLOSURE OF THE INVENTION

Problems to be Solved by the Invention

As the color temperature correction filter disclosed in patent reference literature 1 described above is achieved based upon the principle whereby the spectral characteristics of the light absorption via the dichroic pigment are controlled through voltage application, the light energy absorbed in the dichroic pigment is bound to degrade the pigment molecules and generate heat in the color temperature correction filter. These phenomena become more pronounced particularly when the color temperature is controlled by transmitting illuminating light with a high level of light emission intensity, giving rise to a problem in that the function of the color temperature correction filter is diminished.

According to the 1st aspect of the present invention, a color temperature conversion element comprises: a diffractive optical element that includes a polymer and a liquid crystal and diffracts light with a specific wavelength in incident light.

According to the 2nd aspect of the present invention, in the color temperature conversion element according to the 1st aspect, it is preferred that the diffractive optical element is a curved multilayer film formed by alternately layering a polymer layer and a liquid crystal layer.

According to the 3rd aspect of the present invention, in the color temperature conversion element according to the 1st or the 2nd aspect, it is preferred that: the diffractive optical element is curved so that a concave surface of the diffractive optical element faces a light entry side; and the light diffracted at the diffractive optical element is emitted as reflected light to the light entry side.

According to the 4th aspect of the present invention, in the color temperature conversion element according to the 1st aspect, it is preferred that: there is further provided an electrode that applies an electrical field to the diffractive optical element; and the diffractive optical element allows the incident light to be transmitted when a voltage is applied to the electrode.

According to the 5th aspect of the present invention, in the color temperature conversion element according to the 4th aspect, it is preferred that: there is further provided a first transparent substrate at which a common electrode is formed and a second transparent substrate at which a plurality of divided electrodes are formed; and the diffractive optical element is disposed in a space formed by disposing the first transparent substrate and the second transparent substrate so as to face opposite each other.

According to the 6th aspect of the present invention, in the color temperature conversion element according to the 5th aspect, it is preferred that: the divided electrodes each include a transparent electrically conductive film formed in correspondence to one of a plurality of areas into which a surface of the second transparent substrate is divided; and a transmittance or a diffraction rate of the incident light entering the color temperature conversion element can be altered by arbitrarily selecting electrodes to which the voltage is to be applied.

According to the 7th aspect of the present invention, in the color temperature conversion element according to the 6th aspect, it is preferred that: the diffractive optical element allows the incident light to be transmitted over an area corresponding to a divided electrode with the voltage applied between the divided electrode and the common electrode; and the diffractive optical element diffracts part of the incident light in a specific wavelength range over an area corresponding to a divided electrode with no voltage applied between the divided electrode and the common electrode.

According to the 8th aspect of the present invention, a color temperature conversion device comprises a plurality of color temperature conversion elements according to any one of the 1st through 7th aspects, layered one on top of another, and the plurality of color temperature conversion elements respectively diffract light fluxes in different wavelength ranges.

According to the 9th aspect of the present invention, a color temperature conversion device comprises: a color temperature conversion element according to any one of the 5 through 7; a control unit that selects one or more divided electrodes among the plurality of divided electrodes to which the voltage is to be applied; and a voltage application unit that applies the voltage to the divided electrodes having been selected by the control unit.

According to the 10th aspect of the present invention, in the color temperature conversion device according to the 9th aspect, it is preferred that the control unit selects the divided electrodes so as to achieve a specific value for a color temperature of transmitted light to be transmitted through the color temperature conversion element or of reflected light to be reflected at the color temperature conversion element.

According to the 11th aspect of the present invention, in the color temperature conversion device according to the 9th aspect, it is preferred that the control unit selects the divided electrodes so as to achieve specific values for a color temperature and a color hue of transmitted light to be transmitted through the color temperature conversion element or of reflected light to be reflected at the color temperature conversion element.

According to the 12th aspect of the present invention, in the color temperature conversion device according to the 9th aspect, it is preferred that: there is further provided a color temperature detection unit that detects a color temperature of incident light entering the color temperature conversion device; and the control unit selects divided electrodes to which the voltage is to be applied based upon the color temperature detected by the color temperature detection unit.

According to the 13th aspect of the present invention, in the color temperature conversion device according to any one of the 9th through 11th aspects, it is preferred that: there is further provided a color temperature detection unit that detects a color temperature of incident light entering the color temperature conversion device; and the control unit sets a color temperature to be achieved for transmitted light to be transmitted through the color temperature conversion element or of reflected light to be reflected at the color temperature conversion element based upon color temperature information detected via the color temperature detection unit and selects divided electrodes to which the voltage is to be applied so as to achieve the color temperature having been set.

According to the 14th aspect of the present invention, an illuminator comprises: a color temperature conversion element according to any one of the 1st through 7th aspects; and an illuminating light source that emits an illuminating light flux into the color temperature conversion element.

According to the 15th aspect of the present invention, an illuminator comprises: a color temperature conversion device according to any one of the 8th through 13th aspects; and an illuminating light source that emits an illuminating light flux into the color temperature conversion element.

According to the 16th aspect of the present invention, a camera comprises: an imaging unit that captures an image of a subject; and a color temperature conversion element according to any one of the 1st through 7th aspects, disposed on an optical path extending from the subject to the imaging unit.

According to the 17th aspect of the present invention, a camera comprises: an imaging unit that captures an image of a subject; and an illuminator according to the 14th or 15th aspect which illuminates the subject.

According to the 18th aspect of the present invention, a color temperature conversion method comprises: controlling a state of voltage application to a diffractive optical element including a polymer and a liquid crystal; and selectively diffracting light with a specific wavelength in incident light entering the diffractive optical element in correspondence to the state of voltage application.

According to the 19th aspect of the present invention, in the color temperature conversion method according to the 18th aspect, it is preferred that the light with the specific wavelength in the incident light entering the diffractive optical element is diffracted by controlling a plurality of divided electrodes at the diffractive optical element independently of one another.

EFFECT OF THE INVENTION

According to the present invention, when converting the color temperature of incident light, light with a predetermined wavelength in the incident light is diffracted and thus, the color temperature conversion element is able to maintain its function without becoming degraded by light absorption.

BEST MODE FOR CARRYING OUT THE INVENTION

The following is an explanation of illuminators achieved by adopting the present invention, given in reference to FIGS. 1 through 10.

First Embodiment

Transmission Type

Figure 1:
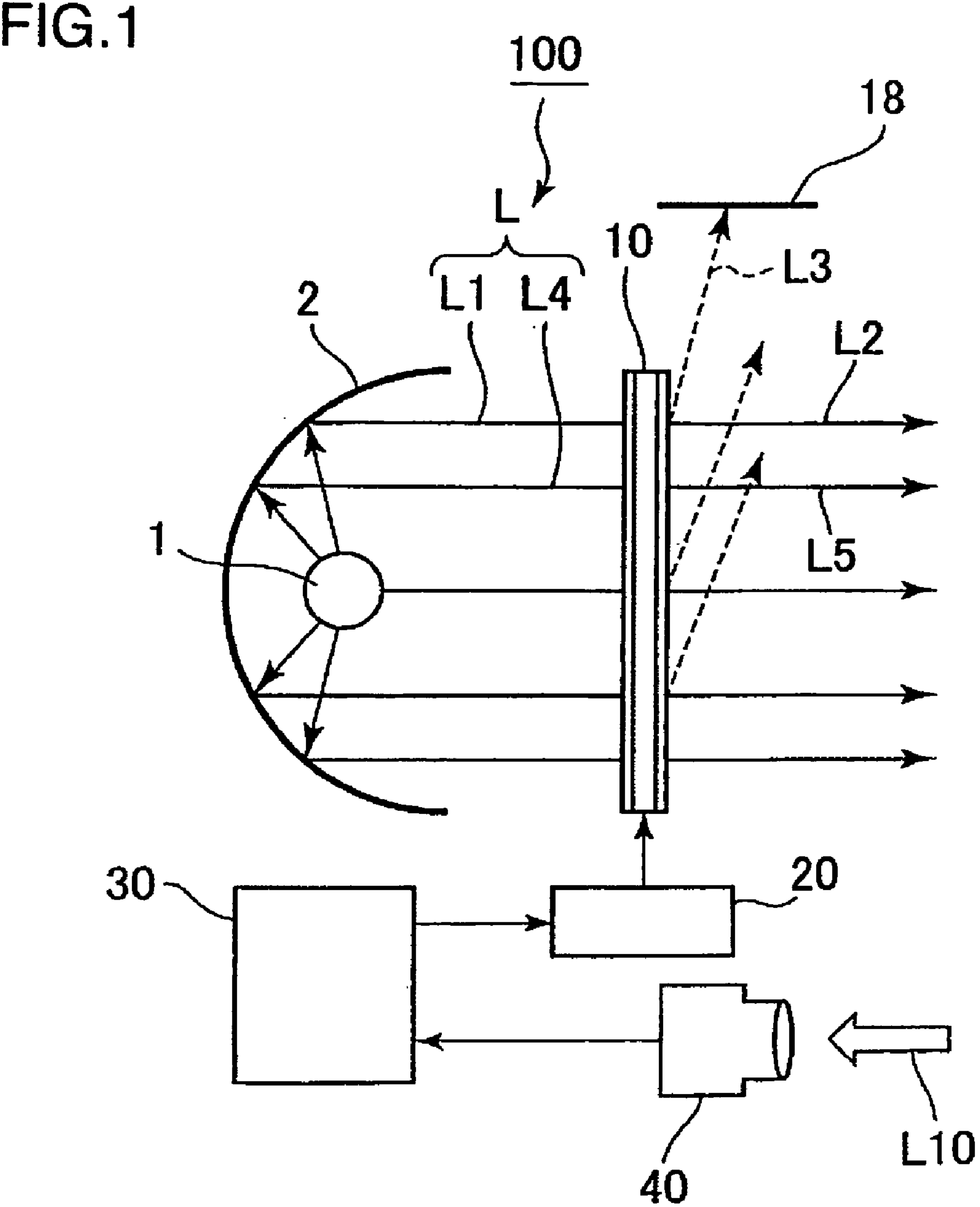
FIG. 1 A diagram schematically showing the overall structure of an illuminator equipped with the color temperature conversion element achieved in a first embodiment of the present invention FIG. 2 A partial sectional view schematically showing the structure adopted in the color temperature conversion element 10 in the first embodiment of the present invention FIG. 3 A plan view of the color temperature conversion element 10 in FIG. 2

FIG. 1 presents a diagram schematically showing the overall structure of an illuminator that provides auxiliary photographic light, equipped with the color temperature conversion element achieved in the first embodiment of the present invention. The illuminator 100, which comprises a light source 1, a transmission-type color temperature conversion element 10 that controls the color temperature of illuminating light L emitted from the light source 1 and reflected at a reflecting mirror 2, a driver 20 that drives and controls the color temperature conversion element 10, a control circuit 30 and a color sensor 40, alters at the color temperature conversion element 10 the color temperature of the illuminating light L from the light source 1 and emits the resulting light to the outside as auxiliary photographic light.

It is to be noted that since the color temperature conversion element 10, the driver 20, the control circuit 30 and the color sensor 40 constitute a color temperature conversion device, the illuminator 100 in the embodiment can be regarded to comprise the light source 1 and the color temperature conversion device. In an alternative configuration, the driver 20, the control circuit 30 and the color sensor 40 may be provided as units separate from the illuminator 100, and in such a case, the illuminator 100 comprises the light source 1 and the color temperature conversion element 10. The color sensor 40 is not an essential component of the illuminator 100.

The light source 1, which may be a xenon discharge tube that emits white light, ranges along a direction perpendicular to the surface of the paper on which the figure is drawn. The light source 1 is disposed at the focusing position achieved via the reflecting mirror 2, which is a semi-cylindrical mirror ranging along the direction perpendicular to the paper surface, and thus, the illuminating light L reflected at the reflecting mirror 2 becomes parallel light which then enters the color temperature conversion element 10 along a direction perpendicular to the color temperature conversion element. The color temperature conversion element 10 is driven with a drive signal output from the driver 20, which, in turn, is controlled by the control circuit 30. The control circuit 30 generates the drive signal, which is to be output from the driver 20 to the color temperature conversion element 10, based upon a signal provided from the color sensor 40. The color sensor 40 is a color temperature sensor that detects light entering from the outside, e.g., subject light L10. Namely, the control circuit 30 controls the color temperature of the auxiliary light output from the illuminator 100 based upon the color temperature of the subject detected at the color sensor 40.

Figure 2:
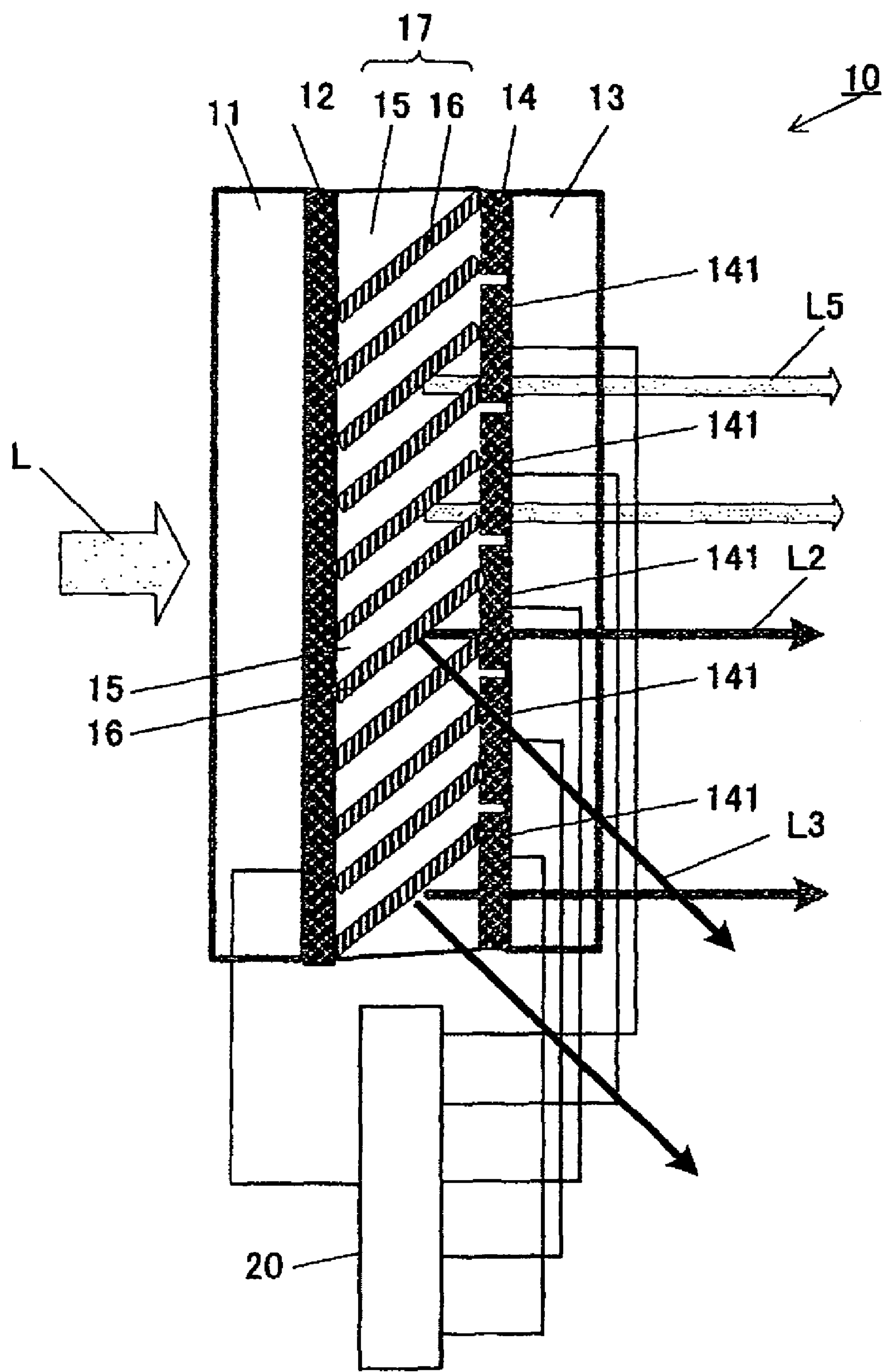
Figure 3:
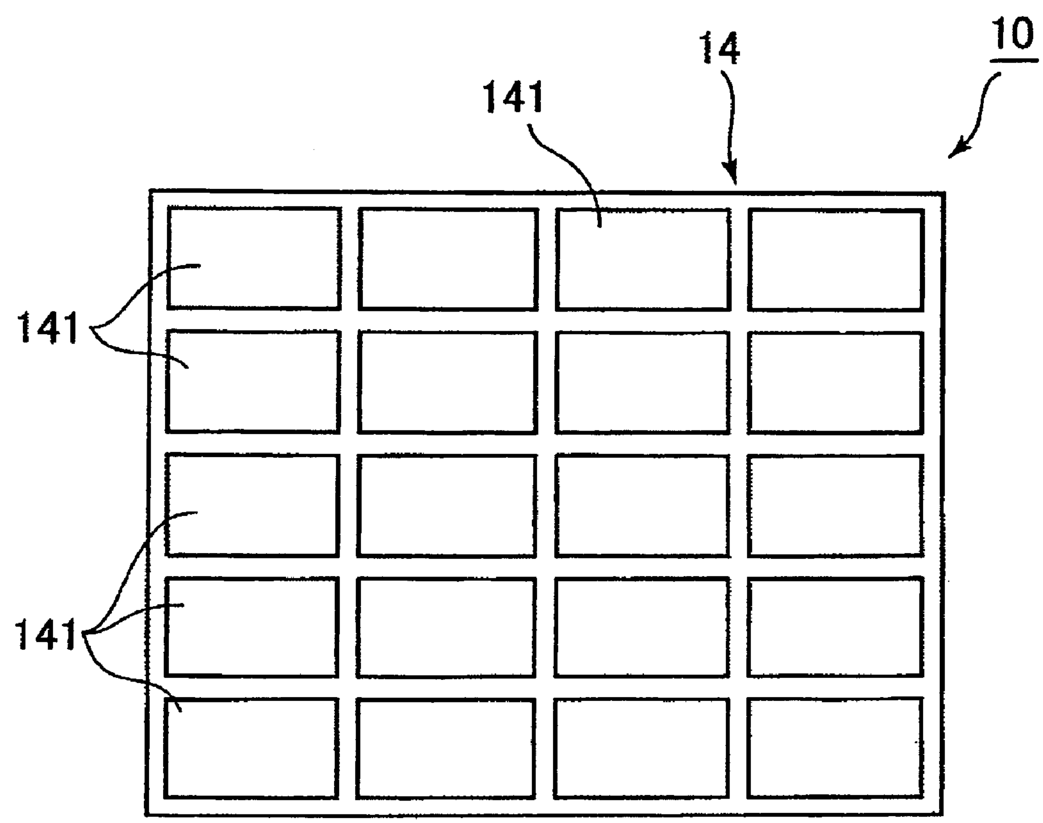
Figure 4:
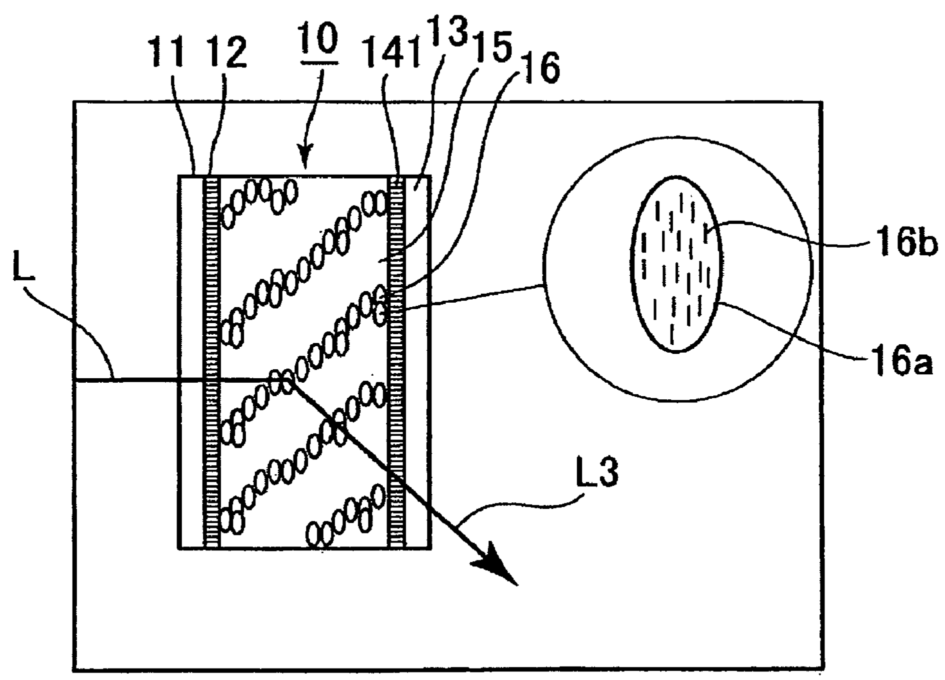
FIG. 4 A partial sectional view showing the color temperature conversion element 10 in FIG. 2 in an enlargement FIG. 5 A graph of the spectral distribution of the transmitted light at the color temperature conversion element 10 achieved in the first embodiment of the present invention FIG. 6 A partial sectional view of a first variation of the color temperature conversion element 10 achieved in the first embodiment FIG. 7 A graph of the spectral distribution of the transmitted light at the layered color temperature conversion element in FIG. 6
Figure 4:
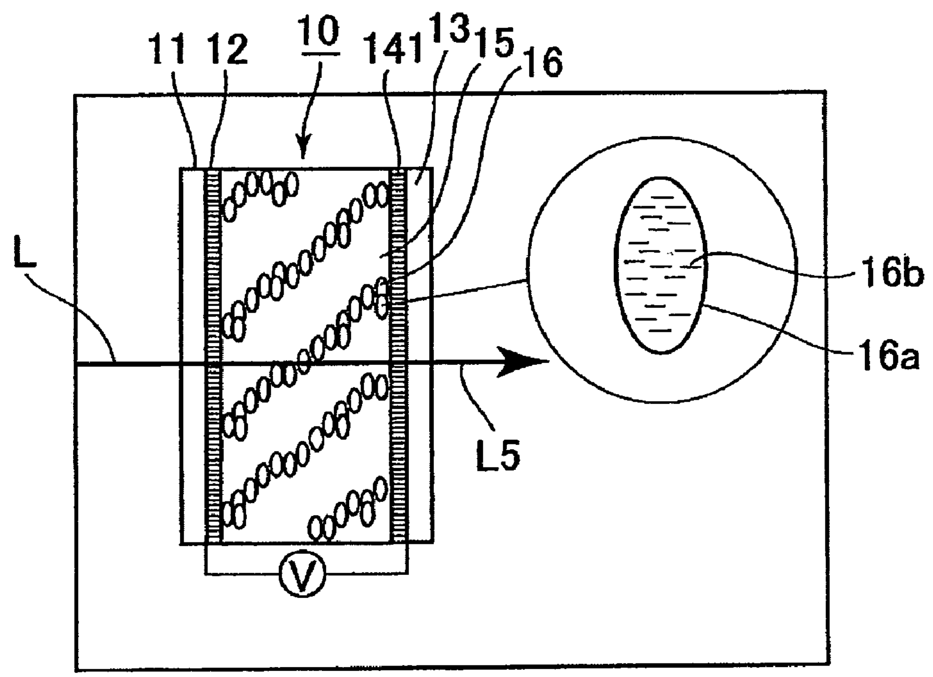

Next, in reference to FIGS. 2 to 6, the color temperature conversion element 10 achieved in the first embodiment is described in detail. FIG. 2 is a partial sectional view schematically showing the structure adopted in the color temperature conversion element 10 in the first embodiment of the present invention. FIG. 3 is a plan view of the color temperature conversion element 10 in FIG. 2, viewed from the side on which the illuminating light L exits. FIG. 4 is a partial sectional view showing in an enlargement part of the color temperature conversion element 10 in FIG. 2.

As shown in FIG. 2, the color temperature conversion element 10 includes transparent glass substrates 11 and 13 and a diffractive optical element 17. A transparent common electrode 12 is disposed on the glass substrate 11, whereas transparent divided electrodes 14 are disposed on the glass substrate 13 set parallel to the glass substrate 11, so as to face opposite the common electrode 12. The common electrode 12 is constituted with a transparent electrically conductive film with a non-patterned uniform surface, whereas the divided electrodes 14 are formed by dividing the surface of the glass substrate 13 into a plurality of areas and forming a transparent, electrically conductive film over each of the divided areas, as shown in FIG. 3. These transparent conductive films may be, for instance, ITO films, and the electrodes formed over the divided areas are referred to as divided ITO films 141 in the following explanation. While there are twenty divided electrodes 14 in the example presented in FIG. 3, the glass substrate surface may be divided into a number of divided areas other than twenty. The color temperature conversion element 10 is formed by disposing the diffractive optical element 17, which includes polymer and liquid crystal layers, between the common electrode 12 at the glass substrate 11 and the divided electrodes 14 at the glass substrate 13.

As shown in FIGS. 2 and 4, the diffractive optical element 17 is formed by alternately layering a transparent polymer 15 and a liquid crystal 16 with an angle of inclination θ relative to the surface of the common electrode 12. As FIG. 4 shows in detail, the liquid crystal layers 16 are each made up with an aggregate of liquid crystal drops 16*a*, and each liquid crystal drop 16*a* contains numerous liquid crystal molecules 16*b*. The liquid crystal molecules 16*b* with uniaxial optical anisotropy manifest different refractive indices for light within a specific wavelength range in the direction extending along the major axis thereof and in the direction perpendicular to the major axis. Namely, when the major axis of the liquid crystal molecules 16*b* is set along the direction perpendicular to the optical axis of the illuminating light L, the refractive index for the light in the specific wavelength range in the illuminating light L at the liquid crystal drops 16*a* or the liquid crystal layers 16 is different from the refractive index for the light in the specific wavelength range at the polymer 15. When the major axis of the liquid crystal molecules 16*b* is oriented so as to extend parallel to the optical axis of the illuminating light L, on the other hand, the refractive index at the liquid crystal drops 16*a* or the liquid crystal layers 16 and the refractive index at the polymer 15 for the illuminating light L are equal to each other.

In FIG. 4(*a*), no voltage is applied between the common electrode 12 and the divided electrode 14, the major axis of the liquid crystal molecules 16*b* are oriented parallel to the surfaces of the electrodes and the illuminating light L is refracted with varying refractive indices at the liquid crystal drops 16*a* or the liquid crystal layers 16 and at the polymer 15. Under these circumstances, the difference in the refractive index allows the diffractive optical element 17 to function as a diffraction grating that diffracts the light in the specific wavelength range in the illuminating light L as diffracted light L3 and allows the light in other wavelength ranges to be transmitted.

In FIG. 4(*b*) a voltage is applied between the common electrode 12 and the divided electrodes 14, the major axis of the liquid crystal molecules 16*b* are oriented perpendicular to the surfaces of the electrodes and the illuminating light L is refracted with refractive indices equal to each other at the liquid crystal drops 16*a* or the liquid crystal layer 16 and at the polymer 15. Accordingly, the diffractive optical element 17 simply functions as a transmissive substance which allows the entire illuminating light L to be transmitted as transmitted light L5.

As described above, the diffractive optical element 17 functions as a phase-type diffraction grating that alters the refractive index distribution for illuminating light in a specific wavelength range in correspondence to the state of an electrical field formed by applying a voltage.

The illuminating light L is white light and the diffractive optical element 17 of the color temperature conversion element 10 is set so as to function as a diffraction grating only for blue light in the illuminating light L, e.g., light in a wavelength range of 400 to 500 nm. The function of the diffractive optical element 17 as the diffraction grating is engaged in conjunction with auxiliary photographic light in order to prevent the face of a person from appearing pallid when the light discharged from the xenon light source 1 tends to take on a bluish tinge on the subject, e.g., when photographing the person at dusk or when photographing a person in a high-grade restaurant.

The color temperature conversion element 10 achieved in the first embodiment outputs the illuminating light after altering its color temperature by controlling the diffractive optical element 17 constituting the phase-type diffraction grating in units of the individual divided ITO films 141. Namely, the diffractive optical element 17 adopts a structure that allows the electrical field formed between the common electrode 12 and each divided ITO film 141 to be controlled independently and diffracts light entering an area corresponding to any divided ITO film 141 with no voltage applied between itself and the common electrode 12. Transmitted light L2 and diffracted light L3 are generated as a result. In addition, the diffractive optical element 17 does not diffract light entering an area corresponding to a divided ITO film 141 at which a voltage is applied and allows the illuminating light L to be transmitted in its entirety over the area. The illuminating light L is thus output as the transmitted light L5.

The control under which a voltage applied state or a voltage unapplied state is achieved between the common electrode 12 and the individual divided ITO films 141 is executed by the driver 20. The driver 20 in the embodiment applies pulse signals with predetermined voltages to the common electrode 12 and each of the individual divided ITO films 141 constituting the divided electrodes 14 and generates the voltage to be applied between the electrodes by using the difference between the two pulse signals. More specifically, it controls the voltage to be applied by controlling the phase of the pulse signal applied to the individual divided ITO film 141. In other words, by applying a pulse signal with the phase thereof reversed from the phase of the pulse signal applied to the common electrode 12, to a given divided ITO films 141, the voltage applied state in which a voltage is applied between the common electrode 12 and the divided ITO film 141 is induced, whereas by matching the phase of the pulse signal applied to the divided ITO film 141 with the phase of the pulse signal applied to the common electrode 12, the voltage unapplied state in which no voltage is applied is induced.

In reference to FIG. 1, the advantages achieved with the illuminator equipped with the color temperature conversion element 10 are explained.

As explained earlier, the illuminating light L is white light and the diffractive optical element 17 of the color temperature conversion element 10 functions as a diffraction grating only for part of the illuminating light L, i.e., blue light in the illuminating light L, in, for instance, a 400 to 500 nm wavelength range. In the following explanation, illuminating light beams L1 and L4 that originate from the light source 1 and enter the color temperature conversion element 10 via the reflecting mirror 2 are discussed.

The illuminating light beams L1 and L4 are illuminating light entering the color temperature conversion element at different entry positions. The illuminating light beam L1, which enters a divided ITO film 141, with no voltage applied between the common electrode 12 and the corresponding divided electrode 14, is split into transmitted light L2 and diffracted light L3. The diffracted light L3 has a wavelength in the 400 to 500 nm range. The diffracted light L3 is absorbed at a light absorbing member 18. Namely, the transmitted light L2 is obtained by removing the diffracted light L3 in the 400 to 500 nm wavelength range from the illuminating light L1. This means that the color temperature of the transmitted light L2 is lower than the color temperature of the illuminating light L1. The entire illuminating light beam L4, which enters a divided ITO film 141 with a voltage applied thereto, becomes transmitted light L5 although there may be a slight loss due to absorption or the like, and the transmitted light L5 maintains the initial color temperature and remains white light. The sum total of the transmitted light beams L2 and L5 is output as auxiliary photographic light.

As described above, the illuminator 100 achieved in the embodiment allows either the voltage applied state or the voltage unapplied state to be selected between the common electrode 12 and each divided ITO film 141 corresponding to a specific divided electrode 14 and thus enables the color temperature conversion element 10 to convert the color temperature of the entire transmitted light to be, output from the color temperature conversion element 10, to a desired level. Namely, the diffractive optical element 17 selectively diffracts part of the incident light at a specific wavelength in accordance with whether or not the voltage is applied between the common electrode 12 and the individual divided ITO films 141 each corresponding to a specific divided electrode 14.

Figure 5:
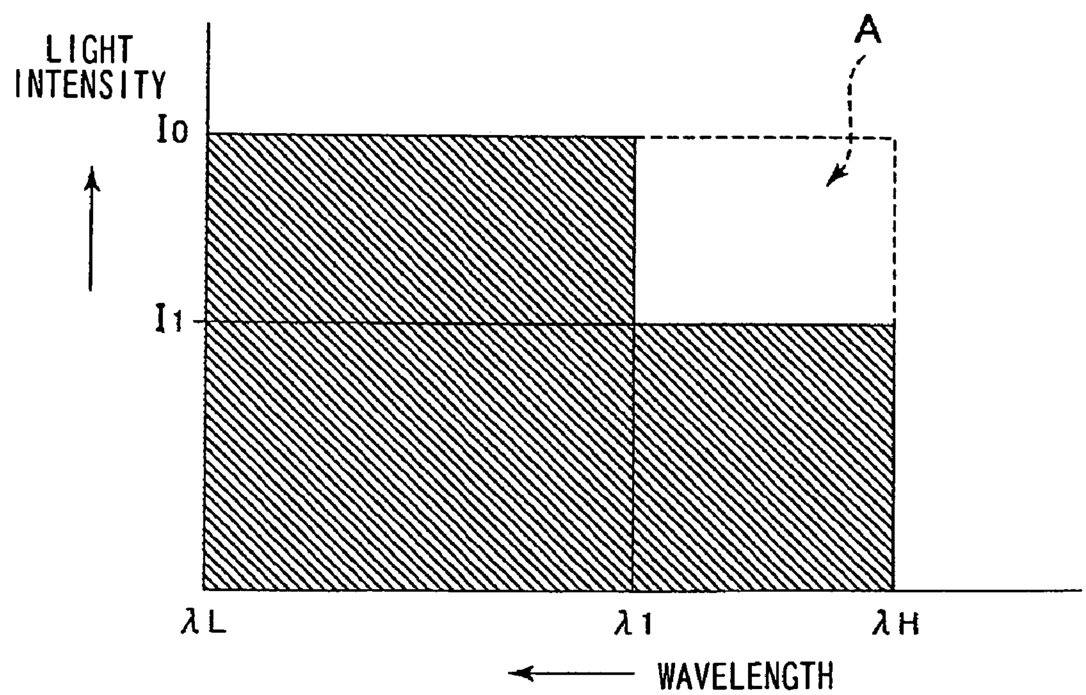

The color temperature conversion achieved in the embodiment is explained in further detail in reference to the graph in FIG. 5 indicating the spectral distribution of the transmitted light. In the graph presented in FIG. 5, the wavelength is indicated along the horizontal axis with the wavelength becoming shorter toward the right and becoming longer toward the left and the light intensity is indicated along the vertical axis. It is assumed that the illuminating light L from the light source with the wavelength thereof in the visible light range $\lambda_L$ to $\lambda_H$ sustains a constant ($I_0$) intensity and that the color temperature conversion element 10 diffracts light in a $\lambda_1$ to $\lambda_H$ wavelength range. The explanation is given in reference to FIG. 5 by assuming that the desired color temperature is achieved for the transmitted light by diffracting 40% of the light in the $\lambda_1$ to $\lambda_H$ wavelength range.

In order to achieve the desired color temperature, the voltage is applied to a plurality of divided ITO films 141 amounting to 60% of the entire area of the divided areas without applying any voltage to the plurality of divided ITO films 141 corresponding to the remaining 40% of the entire area. The driver 20 outputs a signal with a phase matching that of the signal for the common electrode 12 to the divided ITO films 141 corresponding to the 40% of the entire area of the divided areas and outputs a signal with a phase opposite to that of the signal for the common electrode 12, to the divided ITO films 141 corresponding to the 60% of the entire area. As a result, the light intensity (transmittance) $I_1$ of the light in the $\lambda_1$ to $\lambda_H$ range, becomes $I_1=0.6\times I_0$ and the light corresponding to the blank area A indicated with the dotted line in FIG. 5 becomes diffracted and removed from the illuminating light L. Light with the desired color temperature is thus output from the illuminator 100. It is to be noted that the maximum color temperature change can be achieved by maximizing the size of the area A, i.e., by applying no voltage to any of the divided ITO films corresponding to the divided areas.

The method adopted to control the color temperature of the output light by controlling the ratio of the areal total of the plurality of divided ITO films 141 to function as diffraction gratings to the entire area over which the illuminating light L enters as described above is now explained in detail.

It is assumed that the center of gravity of the spectral distribution in FIG. 5 represents the color temperature and the corresponding wavelength is referred to as the center of gravity wave length. With k representing the ratio of the total of the diffraction areas with no voltage applied thereto to the entire area over which the illuminating light L enters, the color temperature T of the transmitted light can be indicated in relation to the diffraction ratio k as expressed in (1) below.

$$T=\{(\lambda_1^2-\lambda_L^2)+(1-k)(\lambda_H^2-\lambda_1^2)\}/2\{(\lambda_1-\lambda_L)+(1-k)(\lambda_H-\lambda_1)\} \qquad (1)$$

Accordingly, the diffraction ratio k should be calculated by modifying expression (1) and then optimal divided ITO films 141 to which the voltage is to be applied should be selected so as to achieve the non-diffraction ratio (1−k) calculated in correspondence to the diffraction ratio k.

In addition, expression (1) may be rewritten by incorporating the spectral characteristics of the light source (the spectral distribution of the illuminating light L) as a function $f$, as expressed in expression (2) below.

$$T = \frac{\int_{\lambda L}^{\lambda 1} xf(x)dx + (1-k)\int_{\lambda 1}^{\lambda H} xf(x)dx}{\int_{\lambda L}^{\lambda 1} f(x)dx + (1-k)\int_{\lambda 1}^{\lambda H} f(x)dx} \tag{2}$$

In this case, too, the diffraction ratio k should be calculated by modifying expression (2) in a manner similar to the manner with which expression (1) is modified and then optimal divided ITO films 141 to which the voltage is to be applied should be selected so as to achieve the non-diffraction ratio (1−k).

It is to be noted that while the right side member and the left-side member do not have matching dimensions in either expression (1) or expression (2), these expressions are written for convenience by assuming that the temperature and the wavelength are represented by matching physical quantities (equivalent to each other). The diffraction ratio k is calculated in the control circuit 30.

The color temperature control for the illuminating light output from the illuminator 100 in FIG. 1 is executed through the following processing procedure.

(1) The color sensor 40 detects the color temperature of subject light L10 and outputs it to the control circuit 30.

(2) The control circuit 30 calculates the desired color temperature T based upon the measured color temperature.

(3) The control circuit 30 calculates an unknown value, i.e., the diffraction ratio k by using expression (1) or expression (2) and selects optimal divided ITO films 141 so as to achieve an areal ratio closest to the non-diffraction ratio (1−k).

(4) Under the control executed by the control circuit 30, the driver 20 outputs a signal with a phase reversed from that of the signal for the common electrode 20 to the selected divided ITO films 141 so as to achieve the voltage applied state and outputs a signal with a phase matching that of the signal for the common electrode 12 to the divided ITO films 141 that have not been selected so as to achieve the voltage unapplied state.

By diffracting the illuminating light at the areas corresponding to the plurality of divided ITO films 141 so as to achieve the diffraction ratio k, as described above, the color temperature of the auxiliary photographic light output from the illuminator 100 can be set to the desired level and a desired color tone is achieved in the image photographed with the auxiliary photographic light. In addition, since part of the illuminating light is diffracted and is thus eliminated from the auxiliary photographic light, the degradation of color temperature conversion element is slowed down.

It is to be noted that since the full (100%) diffraction efficiency is not achieved in the actual device, the diffraction ratio k or the non-diffraction ratio (1−k) should be determined by taking into consideration the effective diffraction efficiency. In addition, it is even more desirable to determine the diffraction ratio k or the non-diffraction ratio (1−k) by also taking into consideration the light flux density (light intensity), which normally varies over the area near the optical axis and the peripheral area.

The diffractive optical element 17 described above may be manufactured as described below. A mixture containing a liquid ultraviolet-curing resin, which is the raw material of the polymer 15 and the liquid crystal drops 16*a* is injected into the space formed between the common electrode 12 and the divided electrodes 14 in advance and the ultraviolet-curing resin is hardened over predetermined intervals through interference exposure during which ultraviolet light is radiated from two directions. Alternatively, the liquid crystal layers 16 may be formed by cutting solidified polymer 15 with an Excimer laser and then filling the spaces where the polymer is no longer present with a liquid crystal.

Figure 6:
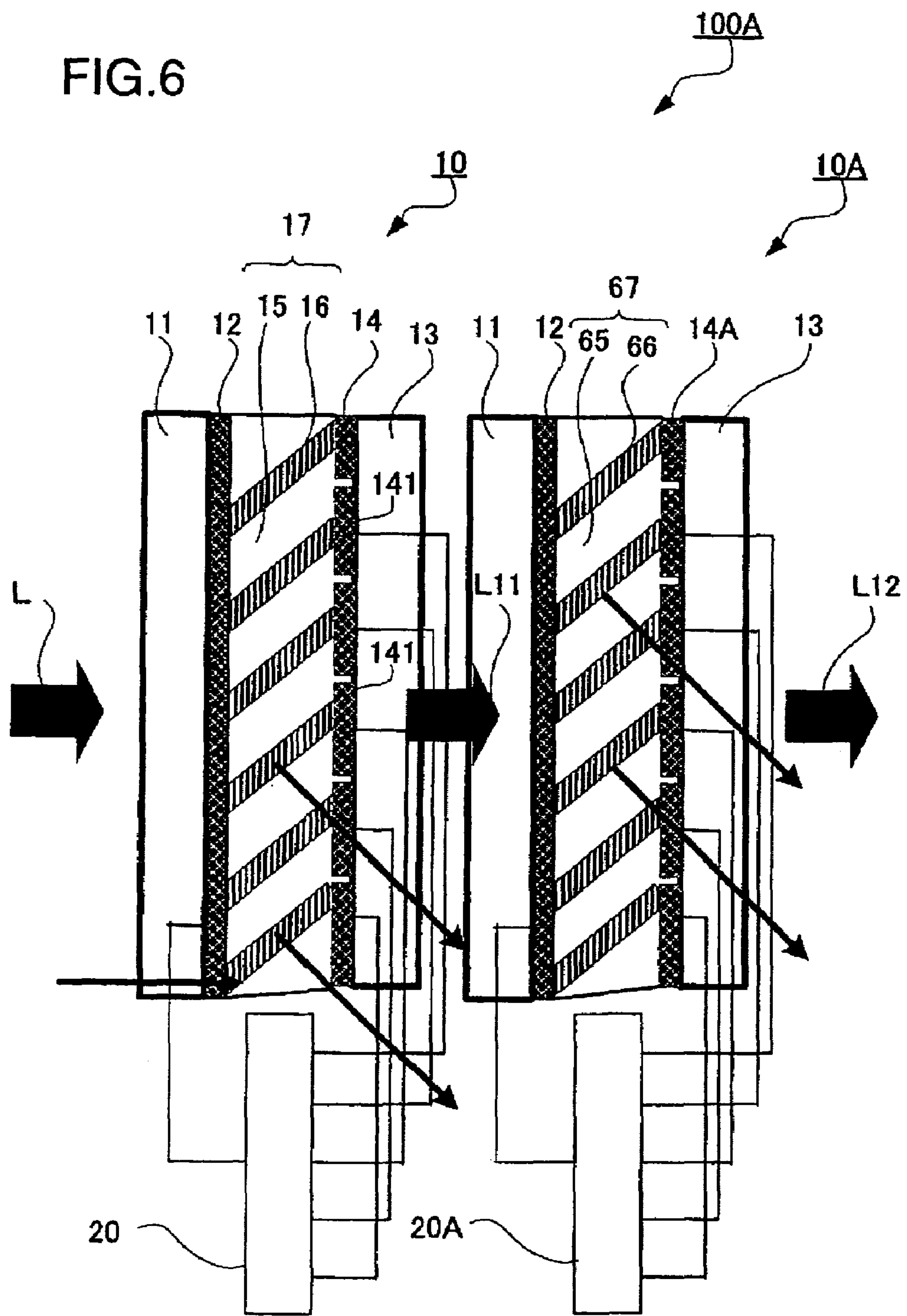
Figure 7:
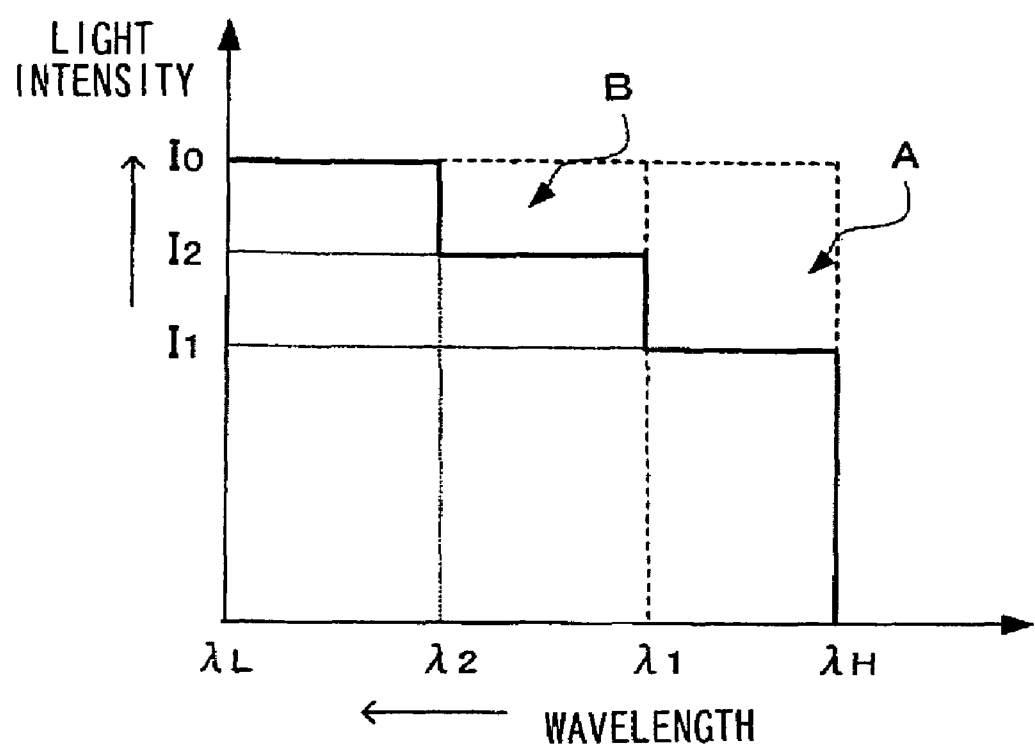

Next, a first variation of the first embodiment is explained in reference to FIGS. 6 and 7.

FIG. 6 is a partial sectional view of a variation of the illuminator 100 achieved in the first embodiment. In the first variation, two transmissive color temperature conversion elements with different diffraction wavelength ranges are stacked over two stages. This layered color temperature conversion element 10A, achieved by layering the two color temperature conversion elements 10 and 10A and disposing them in the optical path of the illuminating light L, as shown in FIG. 6, output light achieving the spectral distribution shown in FIG. 7.

The color temperature conversion element 10 disposed at the frontward stage along the optical path is identical to the element having been explained in reference to the first embodiment. Namely, the diffractive optical element 17 of the color temperature conversion element 10 disposed at the front stage relative to the illuminating light L diffracts light in the $\lambda_1$ to $\lambda_H$ range. While the color temperature conversion element 10A disposed at the rearward stage along the optical path adopts a structure that is basically similar to that of the color temperature conversion element 10, it diffracts light in a wavelength range different from that of the color temperature conversion element 10. Namely, a diffractive optical element 67 of the color temperature conversion element 10A diffracts light in a $\lambda_2$ to $\lambda_I$ wavelength range, i.e., wavelengths greater than those in the $\lambda_1$ to $\lambda_H$ range.

As shown in FIG. 7, the light corresponding to an area A is diffracted and eliminated from the illuminating light L via the color temperature conversion element 10 and, as a result, transmitted light L11 is generated. In addition, the light corresponding to an area B is diffracted and removed from the transmitted light L11 via the color temperature conversion element 10A and transmitted light L12 is thus ultimately generated. In other words, the transmitted light L12 is generated by removing the light corresponding to the areal sum of the areas A and B from the illuminating light L as the diffracted light and thus converting the color temperature.

By layering the plurality of color temperature conversion elements 10 and 10A that diffract light in different wavelength ranges, as described above, a greater color temperature conversion range compared to that achieved with a single color temperature conversion element 10 is assured. In addition, finer color temperature control can be executed with the plurality of color temperature conversion elements each having the equal number of divided areas to that of the color temperature conversion element 10.

Second Embodiment

Reflective

Figure 8:
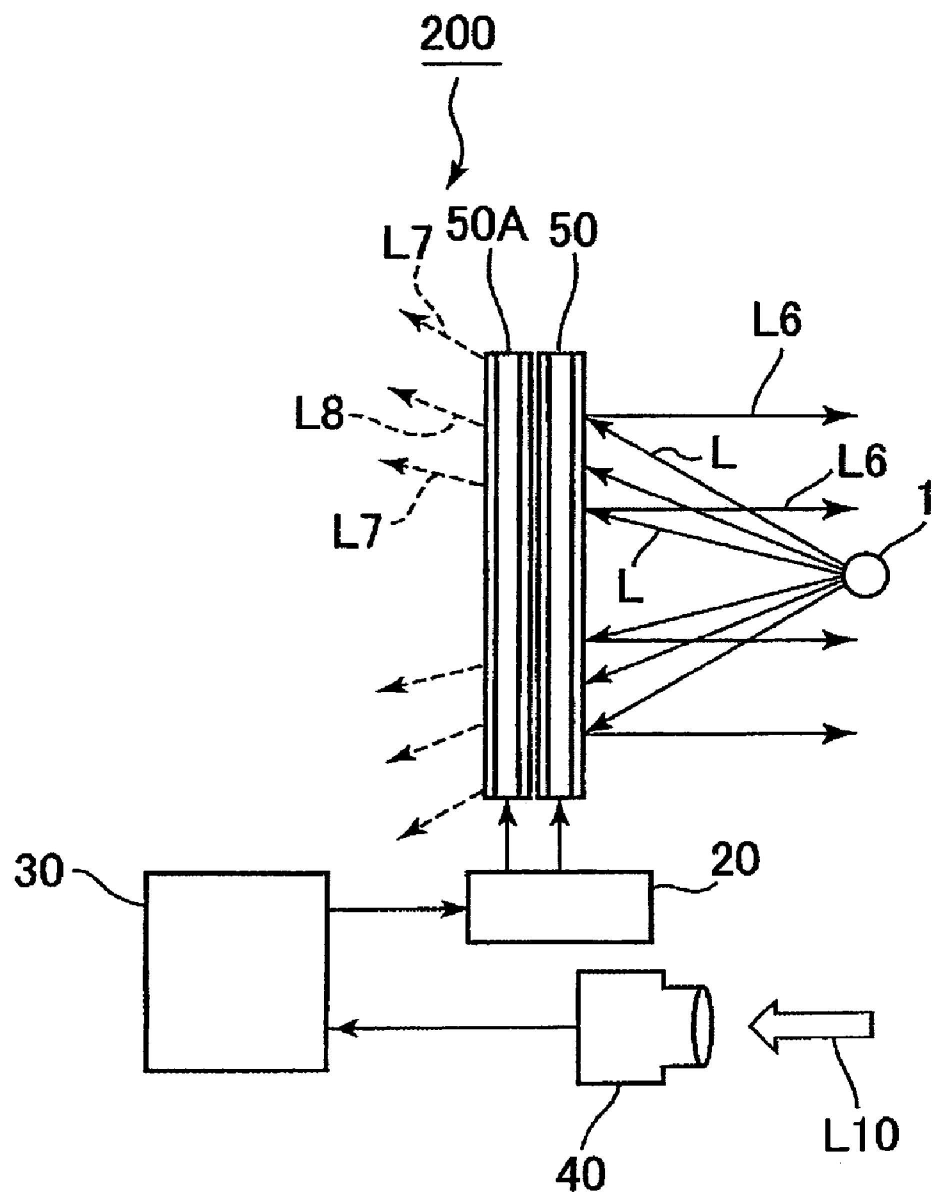
FIG. 8 A diagram schematically showing the overall structure of an illuminator equipped with the color temperature conversion elements achieved in a second embodiment of the present invention FIG. 9 A partial sectional view schematically showing the structure adopted in the color temperature conversion element 50 in the second embodiment of the present invention FIG. 10 A graph of the spectral distribution of the diffracted light at the color temperature conversion elements 50 and 50A achieved in the second embodiment FIG. 11 An xy chromaticity diagram with hues plotted thereon FIG. 12 Examples that may be adopted when installing the color temperature conversion element, the illuminator and the like in various modes
Figure 9:
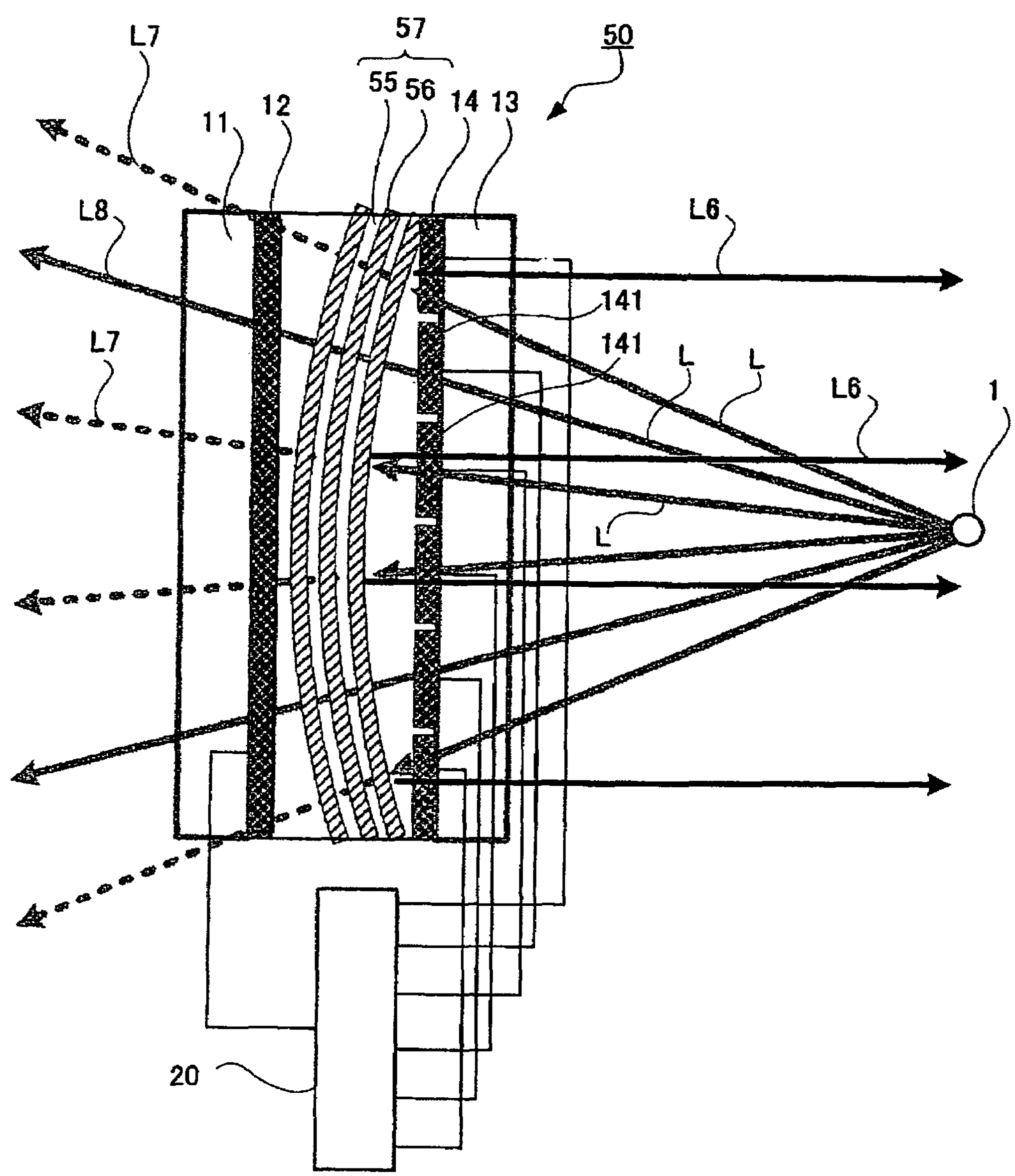

FIG. 8 is a diagram schematically showing the overall structure adopted in an illuminator equipped with the color temperature conversion element achieved in the second embodiment of the present invention. FIG. 9 is a partial sectional view schematically showing the structure adopted in a color temperature conversion element 50 in the second embodiment of the present invention.

While the color temperature conversion element 50 achieved in the second embodiment is a reflective element adopting a structure basically identical to that of the color temperature conversion element 10 in the first embodiment, its diffractive optical element 57 is structurally different from that of the color temperature conversion element 10. This difference necessitates that the illuminator 200 in the second embodiment have a different number of components disposed at different positions from those in the illuminator 100 in the first embodiment. A driver 20, which drives and controls the color temperature conversion element 50, a control circuit and a color sensor 40 are all identical to those in the illuminator 100. The color temperature conversion element 50 and the illuminator 200 achieved in the second embodiment are explained by focusing on their differences from the color temperature conversion element 10 and the illuminator 100 in the first embodiment.

As shown in FIG. 8, the illuminator 200 in the second embodiment includes two reflective color temperature conversion elements 50 and 50A, with varying diffraction wavelength ranges stacked over two stages. A light source 1, ranging along a direction perpendicular to the surface of the paper on which the figure is drawn, is a xenon discharge tube that emits white light and is disposed to the right of the color temperature conversion elements 50 and 50A. Illuminating light L emitted from the light source 1 is radiated into the color temperature conversion elements 50 and 50A and diffracted light L6 resulting from the diffraction at the color temperature conversion elements 50 and 50A to be detailed later is emitted to the right. The color temperature of this diffracted light L6 can be adjusted so as to achieve a color temperature level different from the color temperature of the illuminating light L, and the diffracted light with the adjusted color temperature is emitted to the outside to be used as auxiliary photographic light. Transmitted light beams L7 and L8 transmitted through the color temperature conversion elements 50 and 50A without becoming diffracted advance to the left and are not used as auxiliary photographic light.

As shown in FIG. 9, the diffractive optical element 57 constituting the color temperature conversion element 50 adopts a multilayer film structure achieved by alternately layering a polymer layer 55 and a liquid crystal layer 56 so that the layers curve away from the light source 1, i.e. the concave surface of the curved layers faces to the light source 1. The curvature of the curved multilayer film and the distance between the light source 1 and the color temperature conversion element 50 are set so that effects similar to those realized by disposing the light source 1 at the focusing position of the reflecting mirror 2 (semi-cylindrical mirror) ranging along the direction perpendicular to the paper surface are achieved over the typical wavelength range of the illuminating light L. Thus, the diffracted light L6 occurring as the illuminating light L becomes diffracted at the color temperature conversion element 50 is emitted to the outside as light reflected at the color temperature conversion element 50. The color temperature conversion element 50A adopts a structure similar to that of the color temperature conversion element 50 and achieves an effect similar to that of the color temperature conversion element 50 over a different diffraction wavelength range.

It is assumed that the wavelength range of the illuminating light L is $\lambda_L$ to $\lambda_H$ and that the intensity of the illuminating light L sustained at a constant value $I_0$. It is further assumed that as the illuminating light L enters a divided ITO film 141 in the voltage unapplied state at the color temperature conversion element 50, light in a $\lambda_L$ to $\lambda_3$ wavelength range is diffracted and that as the illuminating light L enters a divided ITO film 141 in the voltage unapplied state at the color temperature conversion element 50A, light in a $\lambda_3$ to $\lambda_H$ wavelength range becomes diffracted. It is to be noted that $\lambda_L > \lambda_3 \lambda_H$. Namely, the color temperature conversion elements 50 and 50A each function as a reflector for the light in the corresponding wavelength range. If, on the other hand, the illuminating light L enters a divided ITO film 141 in the voltage applied state, the light in the full wavelength range $\lambda_L$ to $\lambda_H$ is emitted as transmitted light L8 through the color temperature conversion element 50 or 50A. Accordingly, by selecting optimal divided ITO films to which the voltage should be applied at each of the color temperature conversion elements 50 and 50A, the color temperature of the reflected light output from the color temperature conversion elements 50 and 50A can be adjusted.

Figure 10:
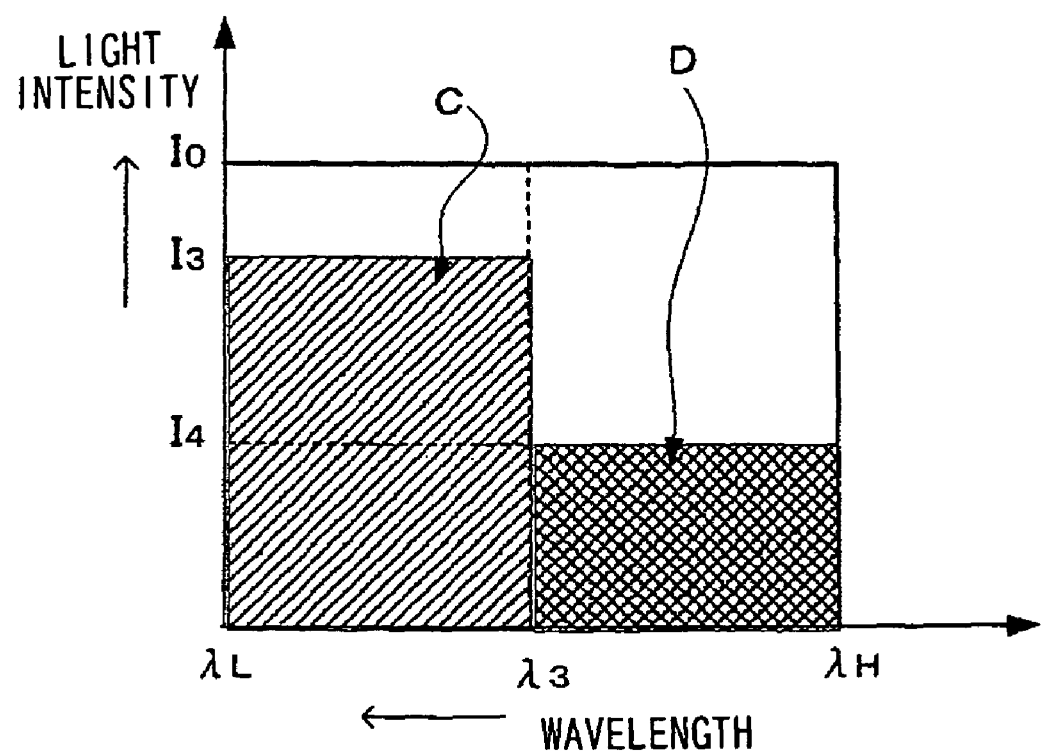

The graph indicating the spectral distribution in FIG. 10 shows how such color temperature control is achieved. For instance, when 80% of the divided ITO films 141 at the color temperature conversion element 50 are set in the voltage unapplied state, diffracted light is generated over an area C and the intensity (reflectance) $I_3$ of the diffracted light is calculated to be $I_3=0.8\times I_0$. Also, when 40% of the divided ITO films 141 at the color temperature conversion element 50A are set in the voltage unapplied state, diffracted light is generated over an area D and the intensity (reflectance) $I_4$ of the diffracted light is calculated to be $I_4=0.4\times I_0$. Thus, the color temperature of the total diffracted light corresponding to the areal sum (C+D) becomes lower than the color temperature of the illuminating light L. In other words, a gravitational center wavelength, which can be assumed to represent the color temperature, shifts toward the longer wavelength side. By layering the two color temperature conversion element 50 and 50A with different diffraction wavelength ranges and selecting the optimal divided ITO films 141 to which the voltage should be applied, i.e., by determining the optimal diffraction ratio, the color temperature of the illuminating light L can be freely converted. Since the diffraction ratio is calculated and the color temperature control is executed in the illuminator in much the same way as in the first embodiment, their explanation is omitted.

By diffracting the illuminating light at the areas corresponding to a plurality of divided ITO films 141 as described above, the color temperature of the auxiliary photographic light output from the illuminator 100 can be set to the desired level and a desired color tone is achieved in the image photographed with the auxiliary photographic light. In addition, since part of the illuminating light is transmitted and is eliminated from the auxiliary photographic light, the degradation of color temperature conversion elements 50 and 50A is slowed down. It is to be noted that reflective color temperature conversion elements with varying diffraction light wavelength ranges may be stacked over three stages or more.

While the color temperature of the emitted light is controlled in the illuminators 100 and 200 achieved in the first and second embodiments, the color hue of the emitted light may be instead controlled as explained in reference to the second variation below.

Figure 11:
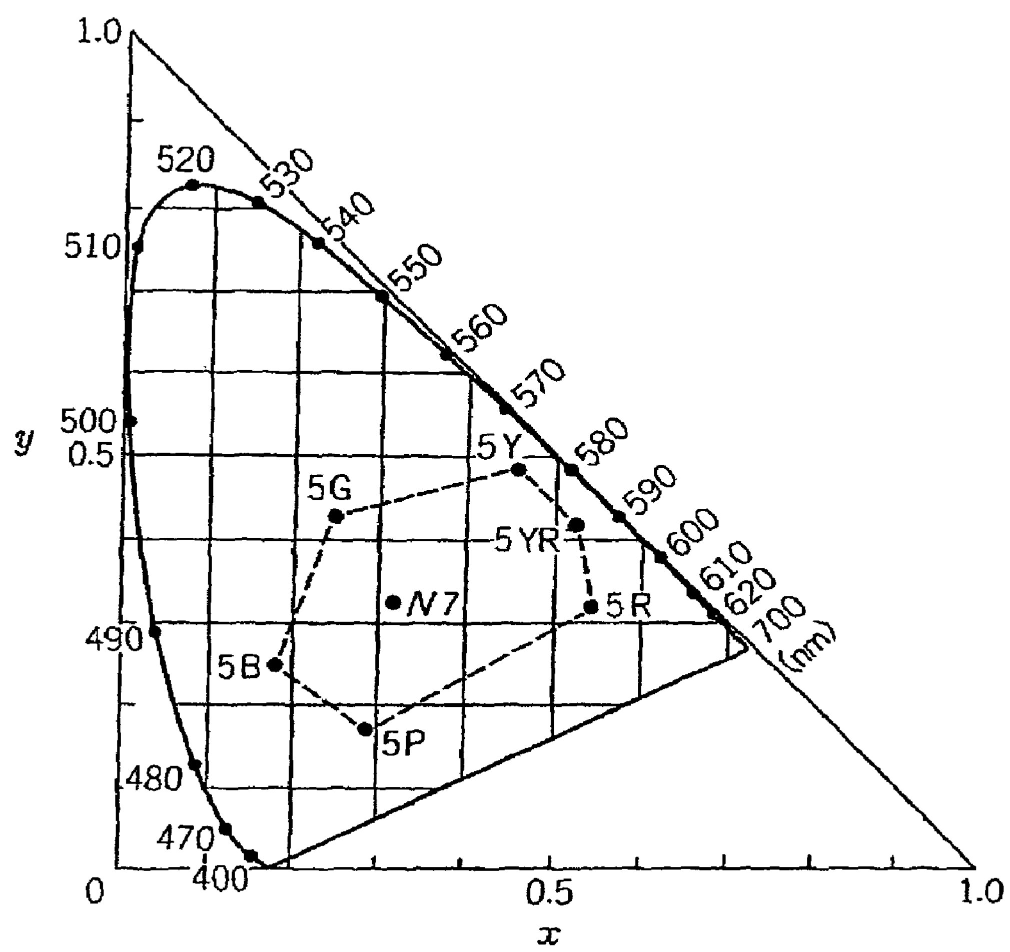

FIG. 11 is an xy chromaticity diagram with typical color hue plotted thereupon. Each plotted point indicates specific component ratios of the three primary colors in light. x represents the ratio of a stimulus value X corresponding to the red component, y represents the ratio of a stimulus value Y corresponding to the green component and z represents the ratio of a stimulus value Z corresponding to the blue component. For instance, in order to convert achromatic light (white light) N7 with its x, y and z values at (0.333, 0.333, 0.333) to green color light 5G with its x, y and z values at (0.249, 0.421, 0.330), the control circuit 30 needs to calculate the diffraction ratio k so as to reduce the ratio x by 0.084, increase the ratio y by 0.088 and reduce the ratio z by 0.003. The process executed subsequently is identical to that having been explained in reference to the first embodiment. The second variation may be adopted in the illuminators 100, 100A and 200 in the first and second embodiments.

The present invention is in no way limited to the embodiments explained above, as long as the features characterizing the invention are not compromised. For instance, the color temperature conversion elements 10 and 50 according to the present invention may be installed in other standard illuminators instead of the illuminators 100 and 200. They may also be utilized as filters in cameras.

Figure 12:
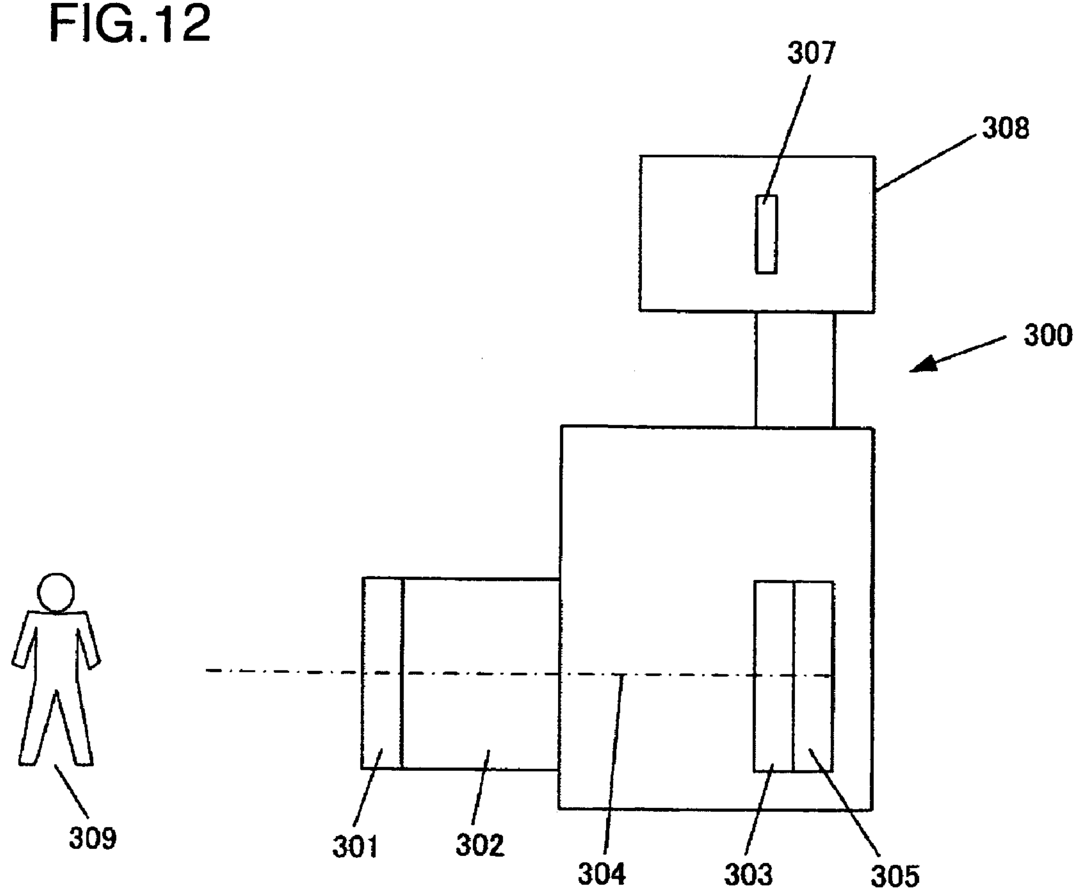

FIG. 12 presents examples of a color temperature conversion element, an illuminator and the like explained earlier may be mounted at a camera 300 by adopting various modes. FIG. 12 shows in a single diagram how a color temperature conversion element or an illuminator may be mounted at the camera 300 in various modes, so as to facilitate the explanation. For instance, a color temperature conversion element 301 to be utilized as a filter as described above may be installed at the front surface of a photographic lens 302. A color temperature conversion element 303 may be installed at the front surface of an imaging element 305 such as a CCD. The color temperature conversion element 301 or the color temperature conversion element 303 should be disposed on an optical path 304 extending from a subject 309 to the imaging element 305 or on an optical axis 304 of the subject light flux. Furthermore, the camera 300 may be equipped with an illuminator 308 which includes a color temperature conversion element 307.

While the invention has been particularly shown and described with respect to preferred embodiments and variations thereof by referring to the attached drawings, the present invention is not limited to these examples and it will be understood by those skilled in the art that various changes in form and detail may be made therein without departing from the spirit, scope and teaching of the invention.

The disclosure of the following priority application is herein incorporated by reference:

Japanese Patent Application No. 2005-051345 filed Feb. 25, 2005

The invention claimed is:

1. A color temperature conversion element comprising:

a diffractive optical element that includes a polymer and a liquid crystal and diffracts light with a specific wavelength in incident light;

a first transparent substrate at which a common electrode is formed; and a second transparent substrate at which a plurality of divided electrodes are formed, wherein the diffractive optical element is disposed in a space formed by disposing the first transparent substrate and the second transparent substrate so as to face opposite each other;

the divided electrodes each include a transparent electrically conductive film formed in correspondence to one of a plurality of areas into which a surface of the second transparent substrate is divided; and a transmittance or a diffraction rate of the incident light entering the color temperature conversion element is altered by arbitrarily selecting electrodes to which the voltage is to be applied.

2. A color temperature conversion element according to claim 1, wherein:

the diffractive optical element is a curved multilayer film formed by alternately layering a polymer layer and a liquid crystal layer.

3. A color temperature conversion element according to claim 1, wherein:

the diffractive optical element is curved so that a concave surface of the diffractive optical element faces a light entry side; and the light diffracted at the diffractive optical element is emitted as reflected light to the light entry side.

4. A color temperature conversion element according to claim 1, wherein:

the diffractive optical element allows the incident light to be transmitted over an area corresponding to a divided electrode with the voltage applied between the divided electrode and the common electrode; and the diffractive optical element diffracts part of the incident light in a specific wavelength range over an area corresponding to a divided electrode with no voltage applied between the divided electrode and the common electrode.

5. A color temperature conversion device, comprising:

a plurality of color temperature conversion elements according to claim 1, layered one on top of another, wherein:

the plurality of color temperature conversion elements respectively diffract light fluxes in different wavelength ranges.

6. A color temperature conversion device, comprising:

a color temperature conversion element according to claim 1;

a control unit that selects one or more divided electrodes among the plurality of divided electrodes to which the voltage is to be applied; and a voltage application unit that applies the voltage to the divided electrodes having been selected by the control unit.

7. A color temperature conversion device according to claim 6, wherein:

the control unit selects the divided electrodes so as to achieve a specific value for a color temperature of transmitted light to be transmitted through the color temperature conversion element or of reflected light to be reflected at the color temperature conversion element.

8. A color temperature conversion device according to claim 6, wherein:

the control unit selects the divided electrodes so as to achieve specific values for a color temperature and a color hue of transmitted light to be transmitted through the color temperature conversion element or of reflected light to be reflected at the color temperature conversion element.

9. A color temperature conversion device according to claim 6, further comprising:

a color temperature detection unit that detects a color temperature of incident light entering the color temperature conversion device, wherein:

the control unit selects divided electrodes to which the voltage is to be applied based upon the color temperature detected by the color temperature detection unit.

10. A color temperature conversion device according to claim 6, further comprising:

a color temperature detection unit that detects a color temperature of incident light entering the color temperature conversion device, wherein:

the control unit sets a color temperature to be achieved for transmitted light to be transmitted through the color temperature conversion element or of reflected light to be reflected at the color temperature conversion element based upon color temperature information detected via the color temperature detection unit and selects divided electrodes to which the voltage is to be applied so as to achieve the color temperature having been set.

11. An illuminator comprising:

a color temperature conversion element according to claim 1; and an illuminating light source that emits an illuminating light flux into the color temperature conversion element.

12. An illuminator comprising:

a color temperature conversion device according to claim 5; and an illuminating light source that emits an illuminating light flux into the color temperature conversion element.

13. A camera comprising:

an imaging unit that captures an image of a subject; and a color temperature conversion element according to claim 1, disposed on an optical path extending from the subject to the imaging unit.

14. A camera comprising:

an imaging unit that captures an image of a subject; and an illuminator according to claim 11, which illuminates the subject.

* * * * *